(12) United States Patent
Jun et al.

(10) Patent No.: US 8,914,732 B2
(45) Date of Patent: Dec. 16, 2014

(54) DISPLAYING HOME SCREEN PROFILES ON A MOBILE TERMINAL

(75) Inventors: Sung Bae Jun, Seoul (KR); In Hwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 746 days.

(21) Appl. No.: 12/692,525

(22) Filed: Jan. 22, 2010

(65) Prior Publication Data

US 2011/0185283 A1 Jul. 28, 2011

(51) Int. Cl.
*G06F 3/048* (2013.01)
*H04M 1/725* (2006.01)

(52) U.S. Cl.
CPC ................................ *H04M 1/72572* (2013.01)
USPC .......................................... 715/745; 715/811

(58) Field of Classification Search
CPC ........................... G06F 3/04817; G06F 3/0481
USPC .......... 715/745, 747, 764, 778, 779, 810–813
See application file for complete search history.

(56) References Cited

U.S. PATENT DOCUMENTS

| | | | | |
|---|---|---|---|---|
| 5,910,799 | A * | 6/1999 | Carpenter et al. ............ | 715/866 |
| 7,386,279 | B2 * | 6/2008 | Wagner et al. ................. | 455/73 |
| 7,603,628 | B2 * | 10/2009 | Park et al. ..................... | 715/764 |
| 2007/0083827 | A1 * | 4/2007 | Scott et al. .................... | 715/811 |
| 2008/0034314 | A1 | 2/2008 | Louch et al. | |
| 2008/0168368 | A1 | 7/2008 | Louch et al. | |
| 2009/0204925 | A1 | 8/2009 | Bhat et al. | |
| 2010/0281408 | A1 * | 11/2010 | Fujioka et al. ................ | 715/765 |

FOREIGN PATENT DOCUMENTS

| | | |
|---|---|---|
| CN | 1832494 | 9/2006 |
| CN | 101299780 | 11/2008 |
| WO | 2009012330 | 1/2009 |

OTHER PUBLICATIONS

The State Intellectual Property Office of the People's Republic of China Application Serial No. 201010132341.6, Office Action dated Jan. 4, 2013, 10 pages.

* cited by examiner

*Primary Examiner* — Omar Abdul-Ali
*Assistant Examiner* — Phuong Nguyen
(74) *Attorney, Agent, or Firm* — Lee, Hong, Degerman, Kang & Waimey

(57) ABSTRACT

A mobile terminal and a method of controlling the mobile terminal are provided. According to the mobile terminal and the method of controlling the mobile terminal, it is possible to automatically change widgets on a home screen in accordance with a user-defined time or location condition. Therefore, it is possible for a user to manually delete or add a widget to or from the home screen.

25 Claims, 12 Drawing Sheets

DISPLAYING HOME SCREEN PROFILES ON A MOBILE TERMINAL

BACKGROUND OF THE INVENTION

1. Field of the Invention

The present invention relates to a mobile terminal and a method of controlling the mobile terminal, in which various widgets can be automatically displayed on a home screen in accordance with user-defined time and/or location settings.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

In order to maximize the portability of mobile terminals, the size of mobile terminals has gradually decreased, whereas the functions of mobile terminals have diversified. Since the size of mobile terminals is small, most display modules for use in mobile terminals generally have a size of about 2-3 inches and are rectangular in shape.

In order to address the difficulty of providing a variety of functions using an insufficient display region of mobile terminals, widgets have been developed. The term 'widget,' as used herein, may include an icon representing a function frequently used, a program for executing the function of an icon selected in response to a key or touch input, and an interface.

Widgets have been spotlighted as next-generation interfaces for mobile terminals because they can be implemented in mobile terminals and can thus provide a plurality of functions frequently used by a user on a single home screen. Conventionally, however, users are required to manually arrange widget icons on a single home screen displayed on a display module (such as a touch screen), or manually add widget icons to or delete widget icons from the single home screen in accordance with their needs.

SUMMARY OF THE INVENTION

The present invention provides a mobile terminal and a method of controlling the mobile terminal, in which various widgets can be automatically displayed on a home screen in accordance with user-defined time and/or location settings.

According to an aspect of the present invention, there is provided a method of controlling a mobile terminal, the method including selecting one of a plurality of home screen profiles that matches with a user-defined condition, each of the home screen profiles including one or more widgets and user-defined widget information specifying the display position and display attributes of each of the widgets; and setting the home screen profile that matches with the user-defined condition to be executable and displaying a number of widgets of the home screen profile that matches with the user-defined condition on a display module in accordance with their display attributes.

According to another aspect of the present invention, there is provided a mobile terminal including a display module; and a controller configured to select one of a plurality of home screen profiles that matches with a user-defined condition and set the home screen profile that matches with the user-defined condition to be able to operate, wherein each of the home screen profiles includes one or more widgets and user-defined widget information specifying the display position and display attributes of each of the widgets and the controller displays a number of widgets of the home screen profile that matches with the user-defined condition on the display module in accordance with their display attributes.

According to another aspect of the present invention, there is provided a method of controlling a mobile terminal, the method including displaying a plurality of home screen profiles on a display module, each of the home screen profiles including one or more widgets and widget information specifying the display attributes of each of the widgets; selecting one of the home screen profiles in response to a touch input detected from the display module; and setting a number of widgets of the selected home screen profile to be executable and displaying the widgets of the selected home screen profile on the display module in accordance with their display attributes.

According to another aspect of the present invention, there is provided a mobile terminal including a display module configured to display a plurality of home screen profiles on a display module, each of the home screen profiles including one or more widgets and widget information specifying the display attributes of each of the widgets; and a controller configured to select one of the home screen profiles in response to a touch input detected from the display module, set a number of widgets of the selected home screen profile to be executable and display the widgets of the selected home screen profile on the display module in accordance with their display attributes.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal,' as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
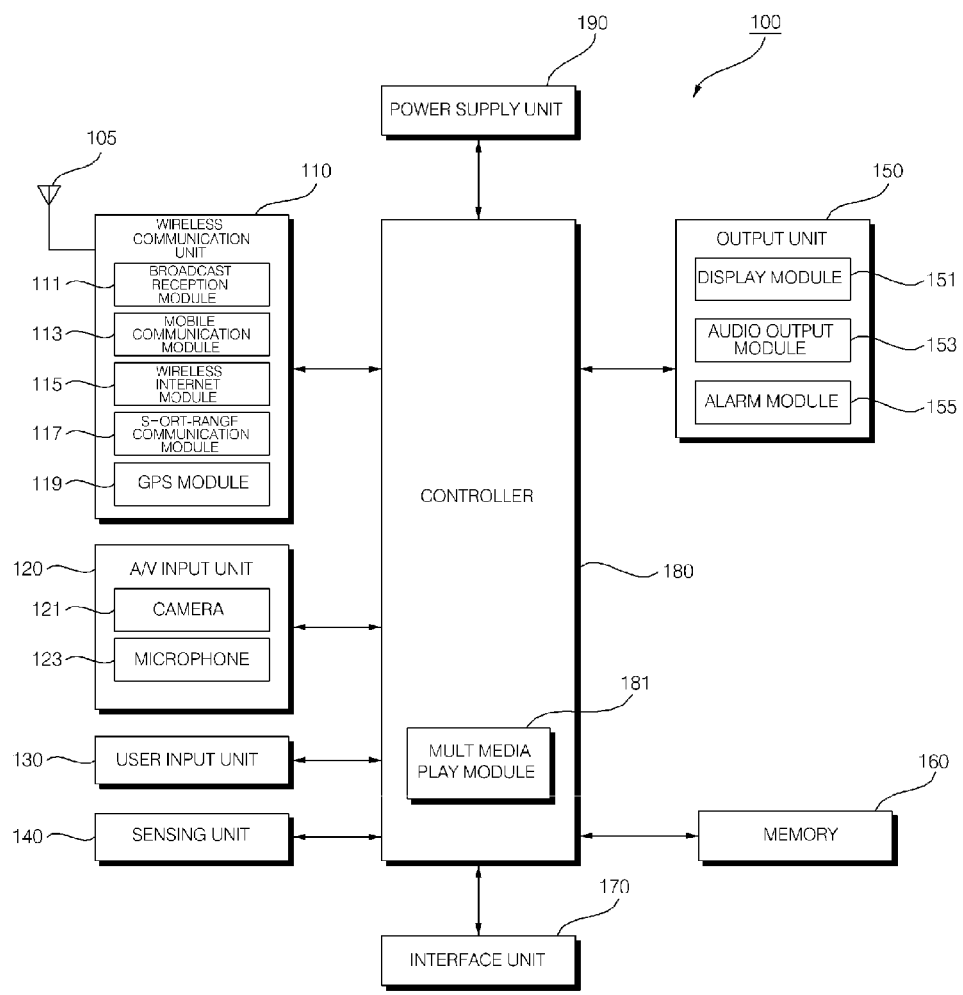
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device.

The wireless internet module 115 may acquire various real-time information such as weather information, traffic information, stock information or news information and may provide the acquired real-time information to the controller 180. Then, the controller 180 may drive a corresponding widget to process the real-time information provided by the wireless internet module 115 and may display the real-time information processed by the corresponding widget on the display module 151.

The term 'widget,' as used herein, includes icons or execution areas corresponding to functions frequently used by the user, programs for executing functions selected in response to a touch input or key input generated by the user, and interfaces. Since most widgets used by the mobile terminal 100 are driven in response to a touch input, they may be implemented as icons. When a widget icon is touched by the user, the controller 180 may execute a program corresponding to the widget icon.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive location information of the mobile terminal 100 from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor in a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen. In this and other exemplary embodiments of the present invention, the terms 'touch screen' and 'display module' can be used interchangeably especially when the display module 151 is driven in response to a touch input.

The sensing unit 140 determines a current state of the mobile terminal 100 such as whether the mobile terminal 100 is opened up or closed, the location of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The output unit 150 may output an audio signal, a video signal and an alarm signal. The output unit 150 may include the display module 151, and an audio output module 153, an alarm module 155 and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel may be a transparent panel attached onto the exterior of the mobile terminal 100 and may be connected to an internal bus of the mobile terminal 100. The touch screen panel may keep monitoring whether the touch screen panel is being touched by the user. Once there is touch input detected from the touch screen panel, the touch screen panel may transmit a number of signals corresponding to the detected touch input to the touch screen panel controller. The touch screen panel controller may process the signals transmitted by the touch screen panel, and may transmit the processed signals to the controller 180. Then, the controller 180 may determine whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, a three-dimensional (3D) display and a transparent display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may generate vibration upon receiving a call signal or a message. In addition, the alarm module 155 may receive a key signal and may generate vibration as feedback to the key signal. Therefore, the user may be able to easily identify the occurrence of an event based on vibration generated by the alarm module 155. Not only the alarm module 155 but also the display module 151 and the audio output module 153 may output an alarm signal in order to alert the user to the occurrence of an event.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The memory 160 may store a plurality of home screen profiles for configuring a user-defined home screen.

A home screen profile is data regarding how to configure a home screen on the touch screen 151. Each of the home screen profiles present in the memory 160 may include one or more widgets. Each of the home screen profiles present in the memory 160 may be selected in response to a touch input generated by the user. When selected, each of the home screen profiles present in the memory 160 may be displayed on the touch screen 151. Alternatively, one of the home screen profiles present in the memory 160 may be automatically selected and displayed on the touch screen 151 according to a conditional expression set in advance by the user.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The controller 180 may withdraw one of the home screen profiles present in the memory 160 that matches with a given conditional expression, and may set a number of widgets of the withdrawn home screen profile to be able to be executed on the touch screen 151. Then, the controller 180 may display the widgets of the withdrawn home screen profile on the touch screen 151 in accordance with their display attributes. The term 'display attribute,' as used herein, includes the display position, size, type and transparency of a widget. When no conditional expression is given, the controller 180 may display a home screen corresponding to one of the home screen profiles selected from the touch screen 151 by the user on the touch screen 151.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a bar-type mobile terminal equipped with a touch screen. However, the present invention is not restricted to a bar-type mobile terminal. Rather, the present invention can be applied to various types of mobile phones, other than a bar-type mobile terminal.

Figure 2:
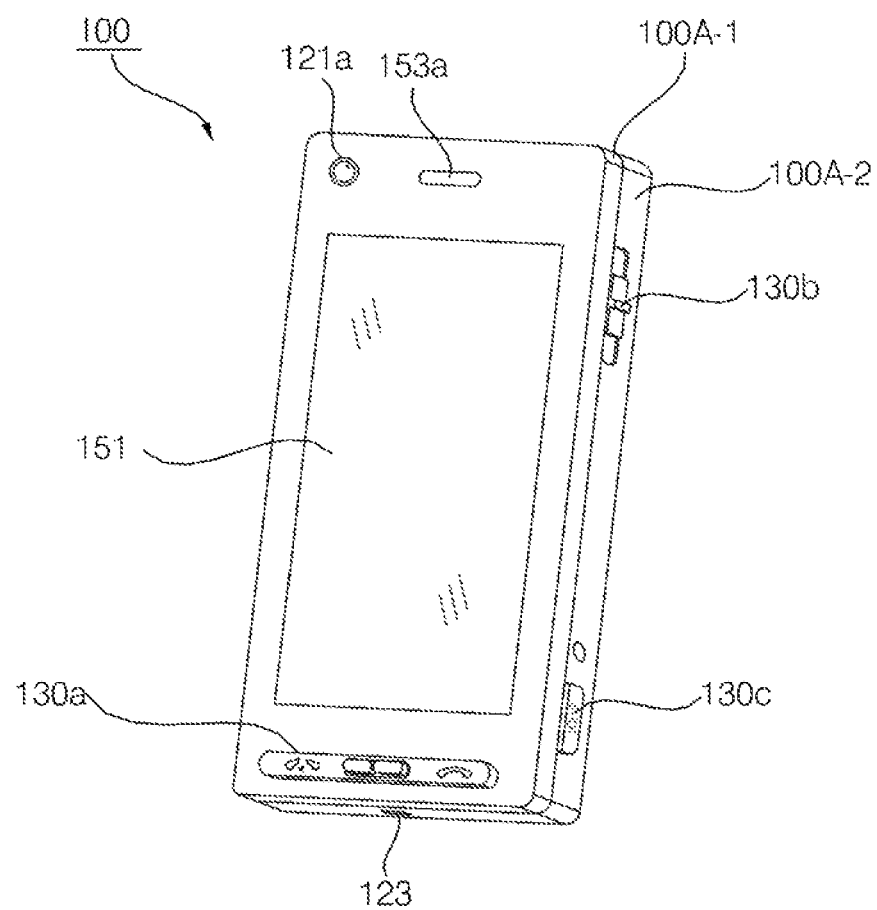
FIG. 2 illustrates a front perspective view of the mobile terminal shown in FIG. 1.

FIG. 2 illustrates a front perspective view of the mobile terminal 100 shown in FIG. 1. Referring to FIG. 2, the exterior of the mobile terminal 100 may be defined by a front case 100A-1 and a rear case 100A-2. Various electronic devices may be installed in the space formed by the front case 100A-1 and the rear case 100A-2. At least one intermediate case may be additionally provided between the front case 100A-1 and the rear case 100A-2. The first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

The display module 151, a first audio output module 153a, a first camera 121a and a first user input unit 130a may be disposed in the front case 100A-1.

A second audio output module (not shown) may be additionally provided in the front case 100A-1. The second audio output module may realize a stereo function along with the first audio output module 153a. The second audio output module may also be used in a speaker-phone mode.

An antenna (not shown) for receiving a broadcast signal may be disposed on one side of the front case 100A-1. The antenna may be installed so as to be able to be pulled out of the front case 100A-1.

Second and third user input units 130b and 130c and the microphone 123 may be disposed on one side of the rear case 100A-2.

The display module 151 may include an LCD or an OLED which can visualize information. Since a touch pad is configured to overlap the display module 151 and thus to form a layer structure, the display module 151 may serve as touch screens. Thus, it is possible to input various information to the mobile terminal 100 simply by touching the display module 151.

The first audio output module 153a may be implemented as a receiver or a speaker. The first camera 121a may be configured to capture a still image or a moving image of the user.

The microphone 123 may be configured to be able to properly receive the voice of the user or other sounds.

The first through third user input units 130a through 130c may be collectively referred to as the user input unit 130. The user input unit 130 may adopt various manipulation methods as long as it can offer tactile feedback to the user.

For example, the first user input unit 130a may be implemented as a dome switch or a touch pad which receives a command or information upon being pushed or touched by the user. Alternatively, the user input unit 130 may be implemented as a wheel, a jog dial, or a joystick.

The first user input unit 130a may be used to input various commands such as 'start,' 'end,' and 'call' to the mobile terminal 100, the second user input unit 130b may be used to select an operating mode for the mobile terminal 100, and the third user input unit 130c may be used as a hot key for activating certain functions of the mobile terminal 100.

Figure 3:
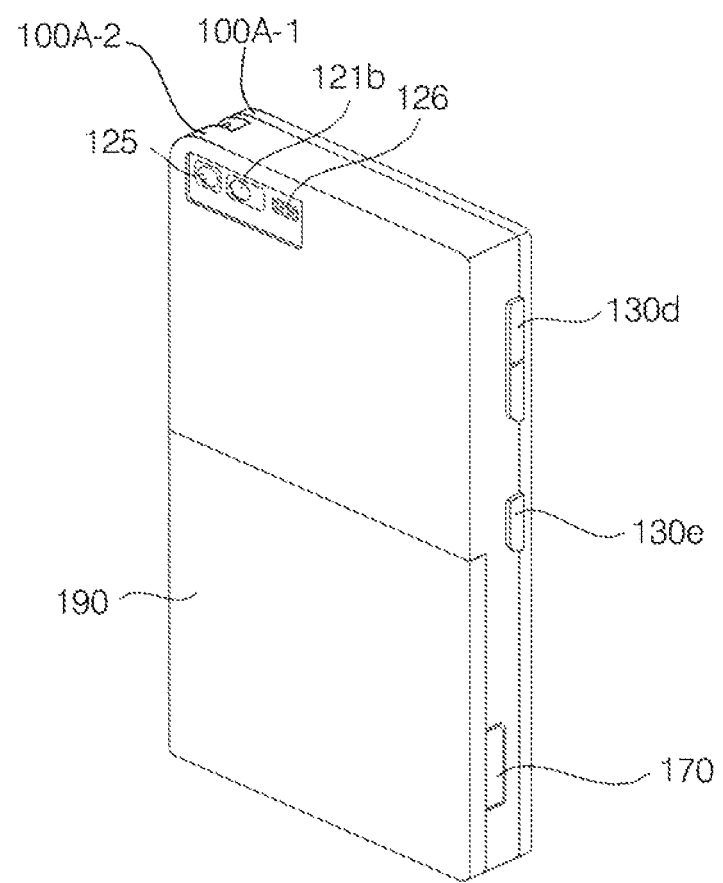
FIG. 3 illustrates a rear perspective view of the mobile terminal shown in FIG. 1.

FIG. 3 illustrates a rear perspective view of the mobile terminal 100 shown in FIG. 2. Referring to FIG. 3, fourth and fifth user input units 130d and 130e and the interface unit 170 may be disposed on one side of the rear case 100A-2, and the second camera 121b may be disposed at the rear of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a cameral flash 126 may be disposed near the second camera 121b. The mirror 125 may be used for the user to prepare him- or herself for taking a self shot. The cameral flash 126 may be used to illuminate a subject when the user attempts to capture an image of the subject with the second camera 121b.

The power supply unit 190 may be disposed in the rear case 100A-2. The power supply unit may be a rechargeable battery and may be coupled to the rear case 100A-2 so as to be attachable to or detachable from the rear case 100A-2.

The second camera 121b and the other elements that have been described as being provided on the rear case 100A-2 may be provided on the front case 100A-1. The second camera 121b may be optional, if the first camera 121a can rotate and can thus cover the photographing direction of the second camera 121b.

Figure 4:
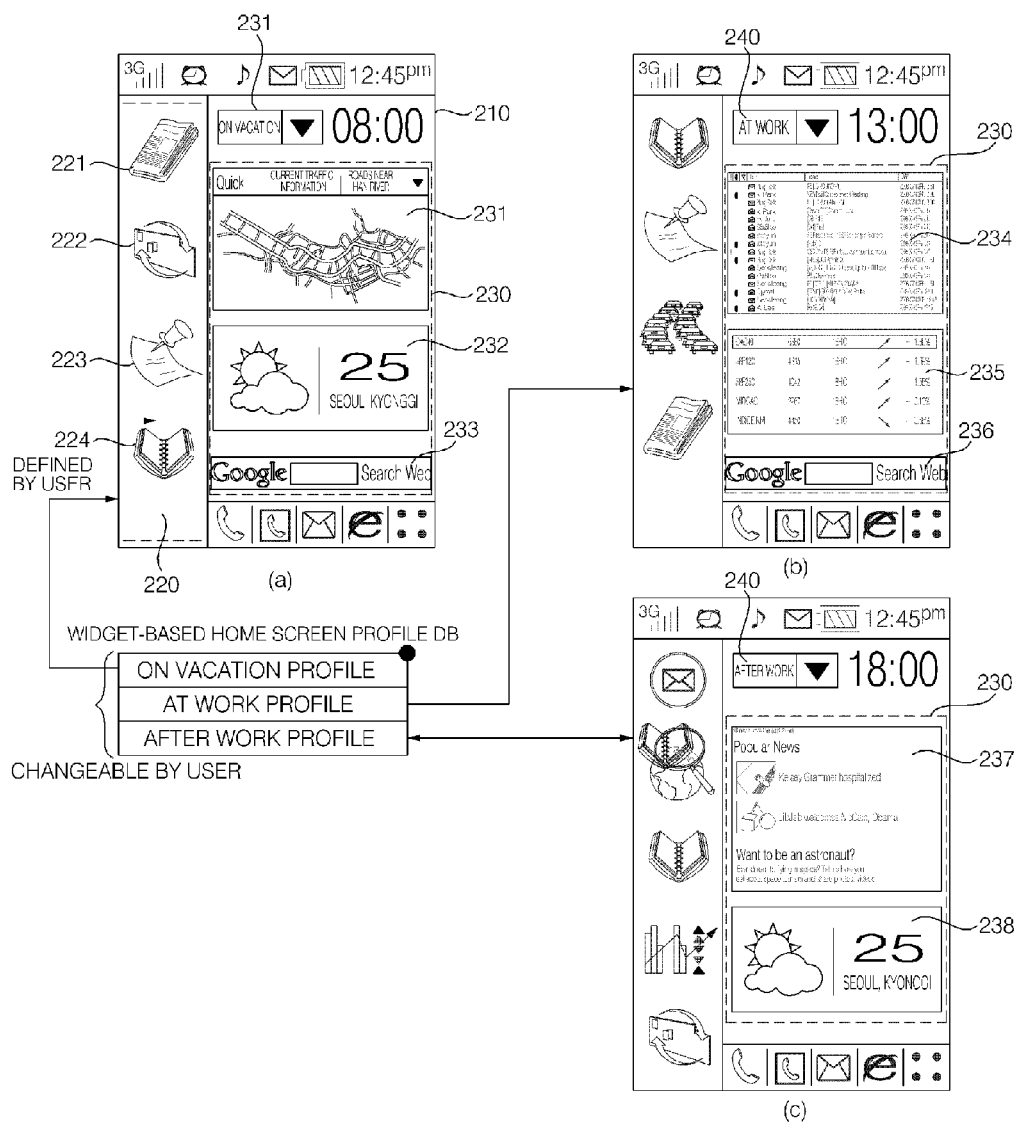
FIG. 4 illustrates how to control the mobile terminal shown in FIG. 1.

FIG. 4 illustrates how to control the mobile terminal 100. Referring to FIG. 4, a home screen displayed by the mobile terminal 100 may change in accordance with a home screen profile set by the user regarding vacation, work and after-work schedules. A profile selection menu 240 may allow one of a plurality of home screen profiles set in advance, i.e., an 'on vacation' home screen profile, an 'at work' home screen profile, and an 'after work' home screen profile, to be selected in response to a touch input.

If the 'on vacation' home screen profile is selected from the profile selection menu 240, a home screen shown in FIG. 4(a)

may be displayed on the display module 151. If the 'at work' home screen profile is selected from the profile selection menu 240, a home screen shown in FIG. 4(*b*) may be displayed on the display module 151. If the 'after work' home screen profile is selected from the profile selection menu 240, a home screen shown in FIG. 4(*c*) may be displayed on the display module 151.

Referring to FIG. 4(*a*), if the 'on vacation' home screen profile is selected from the profile selection menu 240, a home screen corresponding to the 'on vacation' home screen profile may be displayed on the display module 151. The home screen corresponding to the 'on vacation' home screen profile may include a widget selection area 220 and a home screen area 230.

The widget selection area 220 may include a plurality of widgets, which can be executed simply by being touched or can be registered in the home screen area 230 by being dragged and dropped into the home screen area 230.

The home screen area 230 may include a plurality of widgets suited for someone who is on vacation such as a traffic information widget 231, a weather information widget 232 and a search widget 233. The weather information widget 231 and the weather information widget 232 may be displayed as application windows capable of providing real-time traffic information and real-time weather information, respectively.

The widgets included in the widget selection area may be classified as corresponding to the home screen profile set by the user, i.e., the home screen profile 'on vacation.' For example, the widget selection area 220 may include a news widget 221 for providing news information, an email widget 222 for sending or receiving email, a memo widget 223 for writing memos and a diary widget 224.

Referring to FIG. 4(*b*), if the 'at work' home screen profile is selected from the profile selection menu 240, a home screen corresponding to the 'at work' home screen profile may be displayed on the display module 151. A home screen area 230 of the home screen corresponding to the 'at work' home screen profile may include a plurality of widgets suited for someone who works in, for example, a bank or a securities company, such as an email widget 234, a stock information widget 235 and a search widget 236.

Referring to FIG. 4(*c*), if the 'after work' home screen profile is selected from the profile selection menu 240, a home screen corresponding to the 'after work' home screen profile may be displayed on the display module 151. A home screen area 230 of the home screen corresponding to the 'after work' home screen profile may include a plurality of widgets suited for someone leaving the office such as a news widget and a weather information widget.

Each of the home screens shown in FIGS. 4(*a*) through 4(*c*) may be displayed on the touch screen 151 when a corresponding home screen profile is selected in response to a touch input generated by the user. For this, a plurality of home screen profiles created by the user may be stored in the memory 160.

More specifically, if the user selects one of a plurality of home screen profiles from the profile selection menu 240, the controller 180 may display a number of widgets corresponding to the selected home screen profile.

The widgets corresponding to the selected home screen profile may be displayed according to their display attributes (such as display position, transparency, size and display type) set by the user. The widgets corresponding to the selected home screen profile may be displayed in various shapes. For example, the widgets corresponding to the selected home screen profile may be displayed as application windows (as indicated by reference numerals 231 and 232) or icons (as indicated by reference numeral 221).

Figure 5:
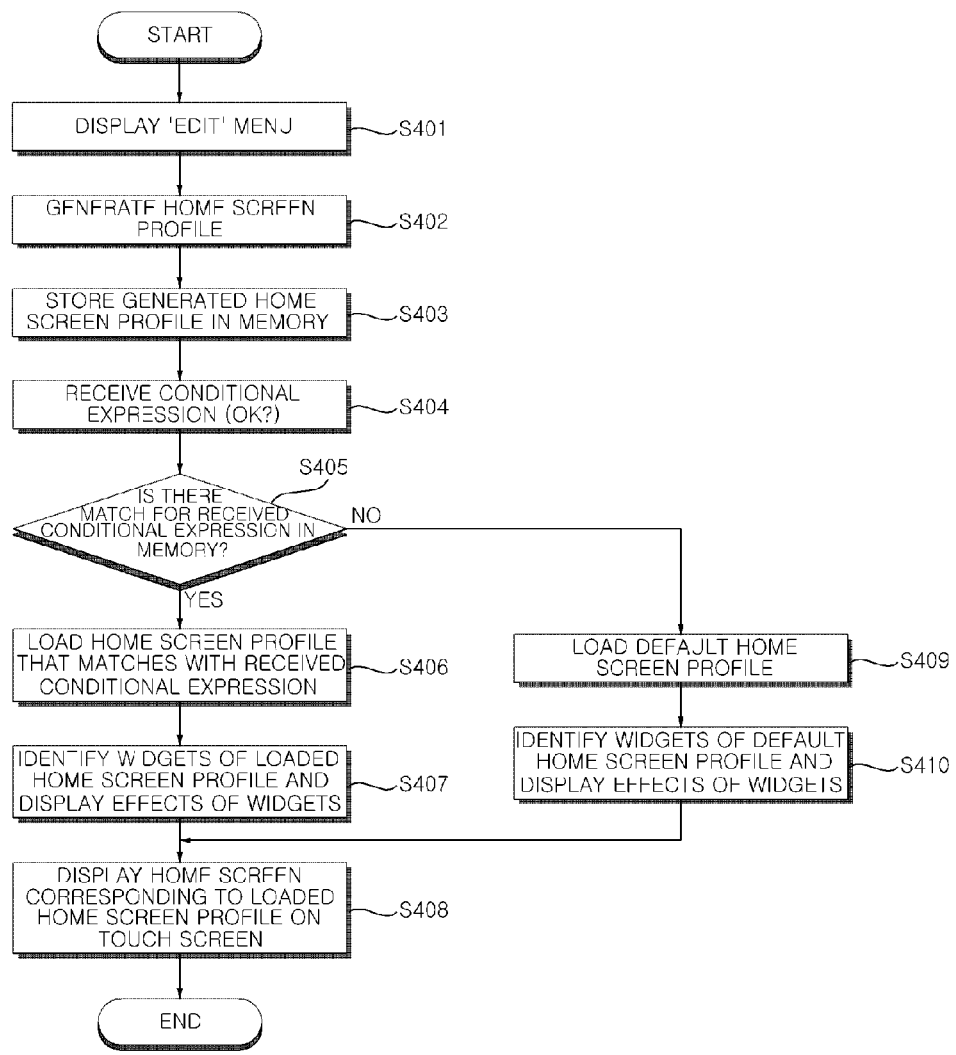
FIG. 5 illustrates a flowchart of a method of controlling a mobile terminal according to a first exemplary embodiment of the present invention.

FIG. 5 illustrates a flowchart of a method of controlling a mobile terminal according to a first exemplary embodiment of the present invention. Referring to FIG. 5, the controller 180 may display an 'edit' menu for creating a home screen profile on the display module 151 (S401). Thus, the user may use the 'edit' menu to determine the title of a home screen profile to be generated, a number of widgets to be registered in the home screen profile, and the display attributes of the widgets.

Thereafter, the controller 180 may generate one or more home screen profiles, each home screen including widget information such as the names, display positions and display effects (such as transparency) of a number of widgets of a corresponding home screen profile (S402).

In this exemplary embodiment, two or more home screen profiles may be generated, and then one of the home screen profiles may be selected in accordance with a given conditional expression.

The controller 180 may store the generated home screen profiles in the memory 160 (S403). Thereafter, the controller 180 may receive a conditional expression input thereto through the 'edit' menu (S404). The received conditional expression may be used to determine which of the home screen profiles present in the memory 160 should be displayed on the display module 151.

The received conditional expression may include a time condition, a location condition or a weather condition. For example, if the received conditional expression includes a time condition stating that the 'at work' home screen profile should be associated with the hours of 9 a.m. to 6 p.m., a home screen corresponding to the 'at work' home screen profile, i.e., the home screen shown in FIG. 4(*b*), may be displayed on the display module 151 during the hours of 9 a.m. to 6 p.m. every day. If the received conditional expression includes a time condition stating that the 'after work' home screen profile should be associated with the hours of 6 p.m. to 9 a.m., a home screen corresponding to the 'after work' home screen profile, i.e., the home screen shown in FIG. 4(*c*), may be displayed on the display module 151 during the hours of 6 p.m. to 9 a.m. every day. If the received conditional expression includes a time condition stating that the 'on vacation' home screen profile should be associated with the period between June 1st and June 15th, a home screen corresponding to the 'on vacation' home screen profile, i.e., the home screen shown in FIG. 4(*a*), may be displayed on the touch screen 151 every day during the period between June 1st and June 15th.

In this regard, the received conditional expression may be interpreted as a condition for activating a certain home screen profile, and may be realized simply by associating a certain period of time or a certain location with the certain home screen profile.

The received conditional expression may include a location condition. For example, if the user's home is at a first location and the user's office is at a second location, different home profiles may be set for the first and second locations. In this case, the controller 180 may switch home screens displayed on the touch screen 151 according to the location of the mobile terminal 100 (or the user's location). For this, the controller 180 may acquire location information of the mobile terminal 100 from the GPS module 119.

Thereafter, the controller 180 may determine whether there is a match for the received conditional expression among the home screen profiles present in the memory 160 (S405). Thereafter, if there is a match for the received conditional expression in the memory 160, the controller 180 may load the home screen profile that matches with the received conditional expression from the memory 160 (S406), and may identify a number of widgets registered in the loaded home screen profile, and the display attributes of the widgets (such as the display positions, display types, and display effects of the widgets) (S407). Thereafter, the controller 180 may display the widgets on the touch screen 151 in accordance with widget information included in the loaded home screen profile (S408).

On the other hand, if none of the home screen profiles present in the memory 160 match with the received conditional expression, the controller 180 may load a default home screen profile from the memory 160 (S409), and may identify a number of widgets registered in the loaded default home screen profile, and the display attributes of the widgets (S410).

Alternatively, if none of the home screen profiles present in the memory 160 may maintain a home screen currently being displayed on the touch screen 151, instead of displaying a default home screen profile.

Figure 6:
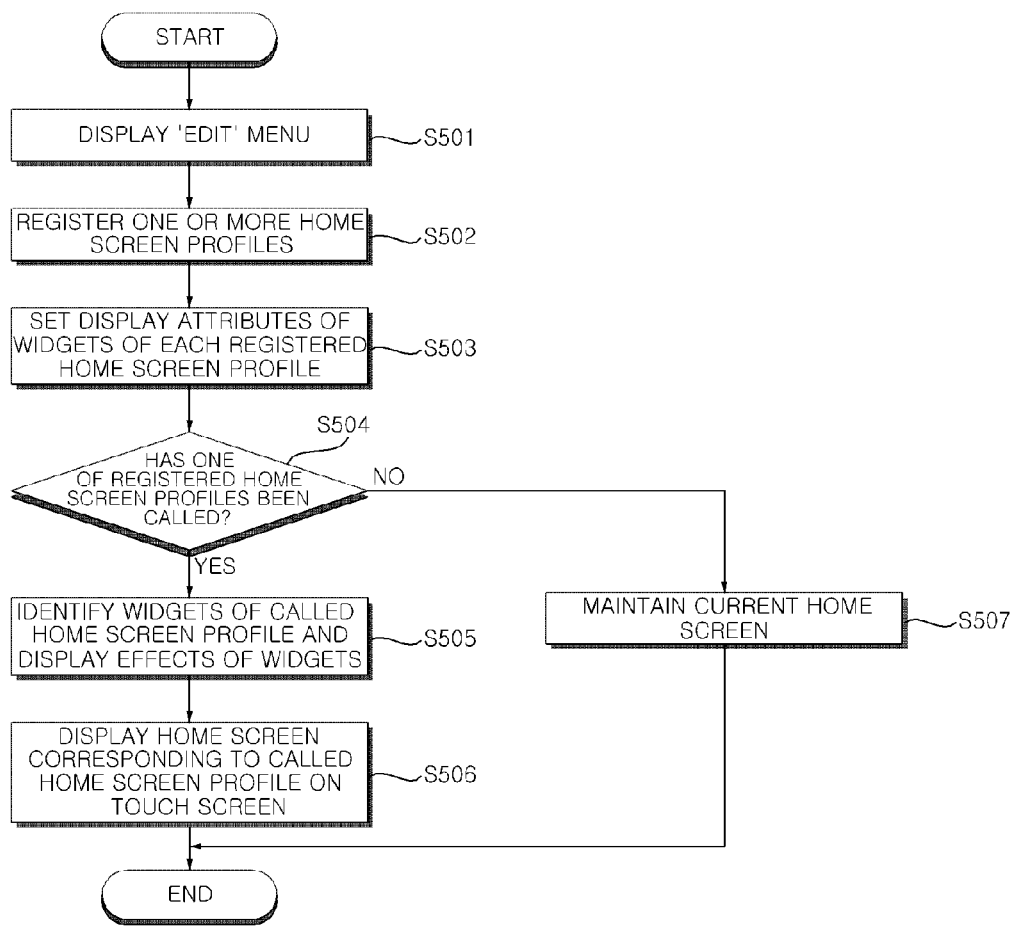
FIG. 6 illustrates a flowchart of a method of controlling a mobile terminal according to a second exemplary embodiment of the present invention.

FIG. 6 illustrates a flowchart of a method of controlling a mobile terminal according to a second exemplary embodiment of the present invention. Referring to FIG. 6, the controller 180 may display an 'edit' menu for creating a home screen profile on the display module 151 (S501).

Thereafter, the controller 180 may receive a title input thereto via the 'edit' menu, may generate one or more home screen profiles, may register the home screen profiles with the input title, and may store the home profiles in the memory 160 (S502).

A home screen profiles may include one or more widgets, which are displayed as icons or application windows for executing applications. The user may determine where on the display module 151 the widgets should be displayed by using the 'edit' menu. Therefore, the home screen profile may include widget information for identifying the widgets and the display attributes of the widgets (such as the display positions and display effects of the widgets). The display effects of the widgets may include the display positions, transparencies, display types, colors, and sizes of the widgets and other additional information regarding the widgets.

Thereafter, the controller 180 may assign an attribute value to each of the widgets of each of the home screen profiles present in the memory 160 using the 'edit' menu (S503).

Thereafter, the controller 180 may determine whether there is a key input received from the display module 151 or from the user input unit 130 for selecting one of the home screen profiles present in the memory 160 (S504). If it is determined that one of the home screen profiles present in the memory 160 has been selected using a profile selection menu displayed on the display module 151, the controller 180 may analyze the selected home screen profile and may identify the widgets of the selected home screen profile and the display attributes of the widgets of the selected home screen profile based on the results of the analysis (S505). Thereafter, the controller 180 may display the widgets of the selected home screen profile on the display module 151 in accordance with their display attributes (S506). If it is determined that the selected home screen profile has not yet been selected, the controller 180 may maintain a home screen currently being displayed on the touch screen 151 (S507).

Figure 7:
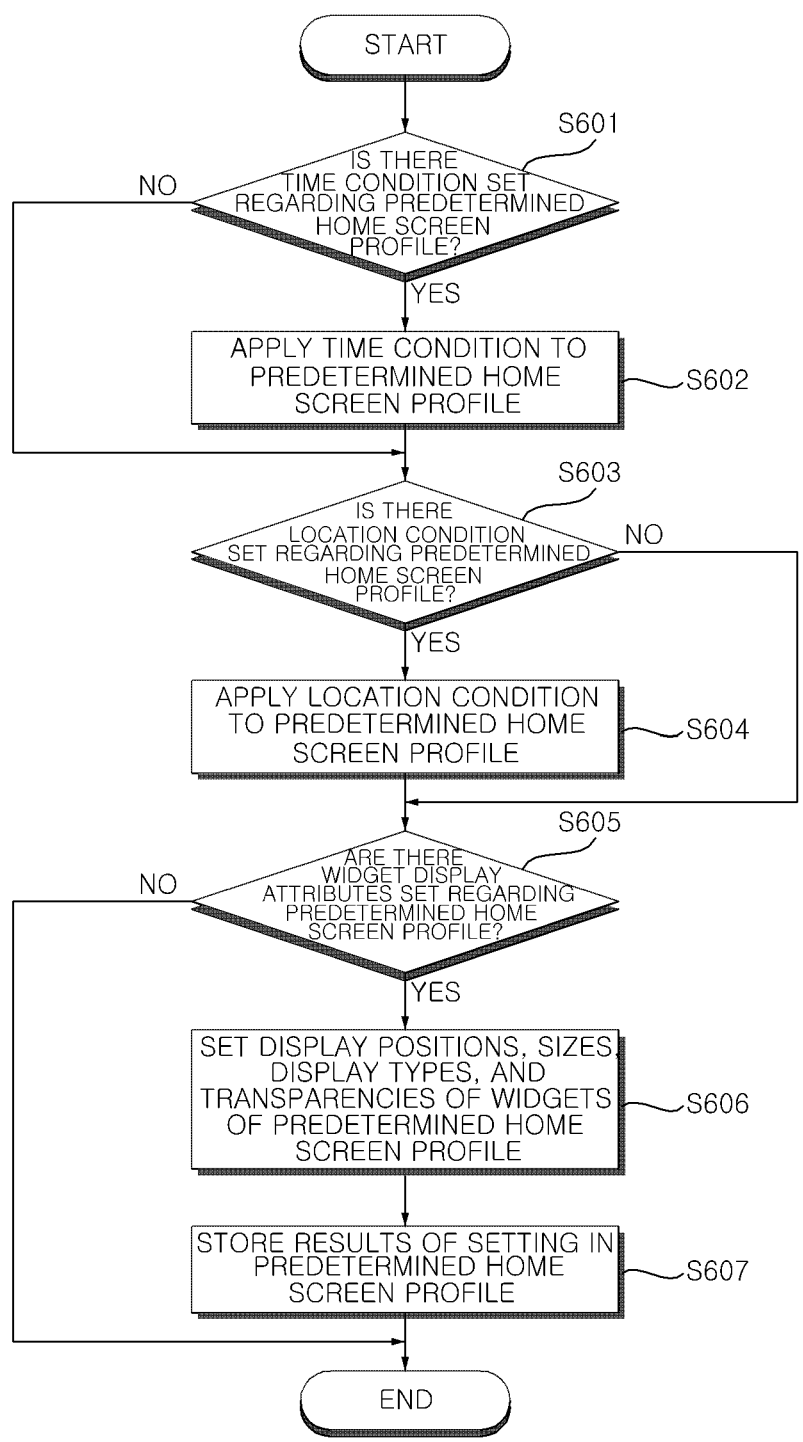
FIG. 7 illustrates a detailed flowchart of the setting of a conditional expression for a home screen profile using an 'edit' menu for creating a home screen profile, as performed in the method of the first exemplary embodiment.

FIG. 7 illustrates a flowchart of the setting of a conditional expression using an 'edit' menu for creating a home screen profile, as performed in the method of the first exemplary embodiment. Referring to FIG. 7, a conditional expression may define a condition for automatically changing home screens upon the arrival of a predetermined time or the arrival at a certain location.

The controller 180 may determine whether there is a time condition set through the 'edit' menu regarding a predetermined home screen profile (S601). A time condition may state that a predetermined home screen must be automatically displayed on the touch screen 151 upon the arrival of a predetermined time. If there is a time condition set regarding a predetermined home screen profile, the controller 180 may apply the time condition to the predetermined home screen profile (S602).

Thereafter, the controller 180 may determine whether there is a location condition set through the 'edit' menu regarding the predetermined home screen profile (S603). A location condition may state that a certain home screen must be automatically displayed on the display module 151 upon the arrival at a certain location, and may be set using a map or text data provided by the 'edit' menu.

If there is a location condition set regarding the predetermined home screen profile, the controller 180 may apply the location condition to the predetermined home screen profile (S604).

Thereafter, the controller 180 may determine whether the display attributes of a number of widgets of the predetermined home screen profile have been set through the 'edit' menu (S605).

Thereafter, if it is determined that the display attributes of a number of widgets of the predetermined home screen profile have been set, the controller 180 may set the display positions, sizes, display types and transparencies of the widgets based on the display attributes of the widgets (S606), and may store the results of the setting in the predetermined home screen profile (S607).

Figure 8:
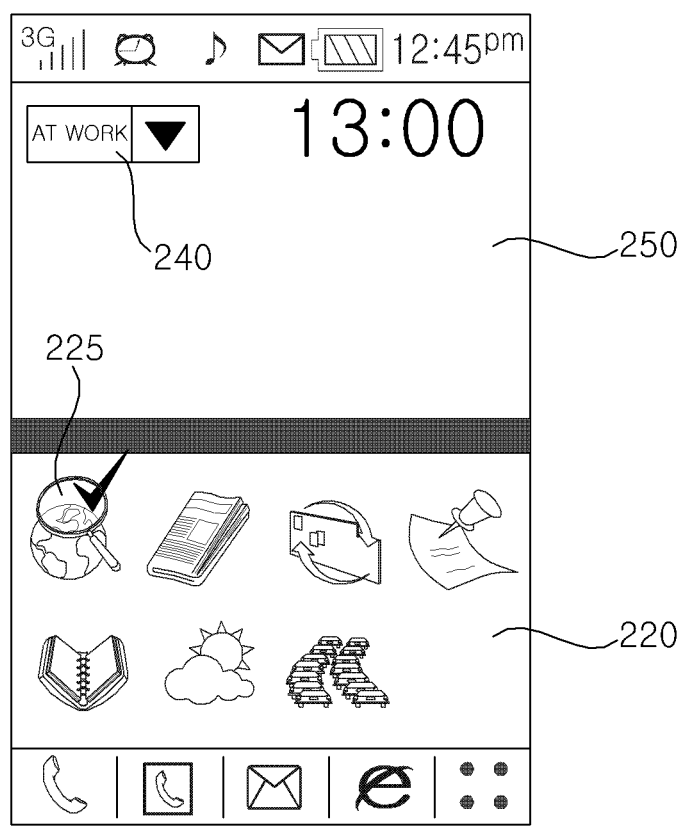
FIG. 8 illustrates a diagram of a screen showing an example of the 'edit' menu.

FIG. 8 illustrates a diagram of a screen showing an example of an 'edit' menu for creating a home screen profile. Referring to FIG. 8, the user may choose a title or category for a home screen profile to be generated from a profile selection menu 240. For example, the user may choose a category 'at work' is selected from the profile selection menu 240. A plurality of widgets may be displayed in a widget selection area 220. Each of the widgets may be registered in a home screen profile entitled 'at work' by being dragged and dropped into an 'edit' window 250.

Figure 9:
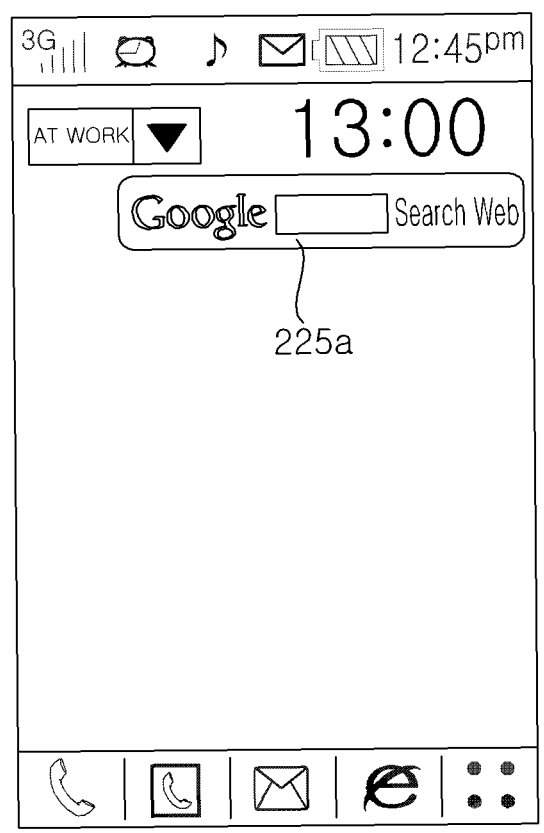
FIG. 9 illustrates a diagram of a screen displayed when one of a plurality of widgets displayed in a widget selection area shown in FIG. 8 is selected.

FIG. 9 illustrates a diagram of a screen displayed when one of the widgets displayed in the widget selection area 220 shown in FIG. 8 is selected. Referring to FIGS. 8 and 9, if a search widget 225 displayed in the widget selection area 220 is dragged and dropped into the 'edit' window 250, the search widget 225 may be displayed in the 'edit' window 250 as, for example, a program execution window.

More specifically, if a touch input for selecting the search widget 225 is received, the controller 180 may display a menu for setting the display attributes of the search widget 225 such as the display position, size and transparency of the search widget 225 on the display module 151. The user may determine the display position of the search widget 225 simply by dragging and dropping the search widget 225.

The controller 180 may additionally display a popup window for determining the transparency and display type of the search widget 225 on the display module 151. For example, the controller 180 may allow the user to choose the level of transparency between 0 (opaque) and 99 (almost transparent) and thus to determine the transparency of the search widget 225. In addition, the controller 180 may allow the user to choose to display the search widget 225 as an icon or a program execution window.

Figure 10:
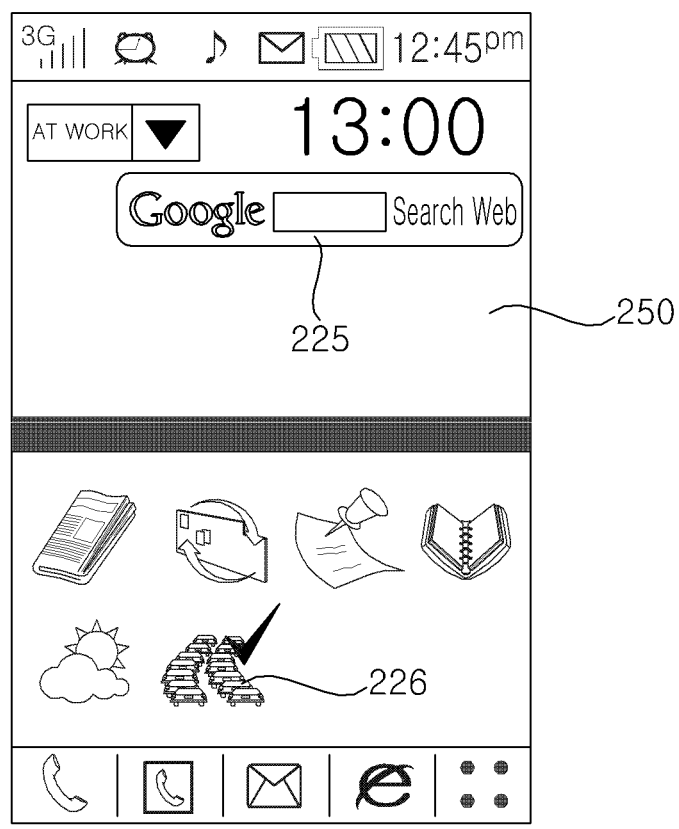
FIG. 10 illustrates a diagram of a screen displayed when the setting of the display attributes of a widget is complete.

When the setting of the display attributes of the search widget 225 is complete, the controller 180 may display a screen shown in FIG. 10 on the display module 151, and may allow the user to additionally edit a home screen profile corresponding to the category 'at work.'

FIG. 10 illustrates a diagram of a screen displayed on the display module 151 when the setting of the display attributes of the search widget 225 is complete. Referring to FIG. 10, the widget selection area 220 may be displayed back at the bottom of the display module 151 when the setting of the display attributes of the search widget 225 is complete. A number of widgets displayed in the widget selection area 220 may be added to the 'edit' window 250. If one of the widgets displayed in the widget selection area 220, e.g., a traffic information widget 226, is selected, a screen shown in FIG. 11 may be displayed on the display module 151.

Figure 11:
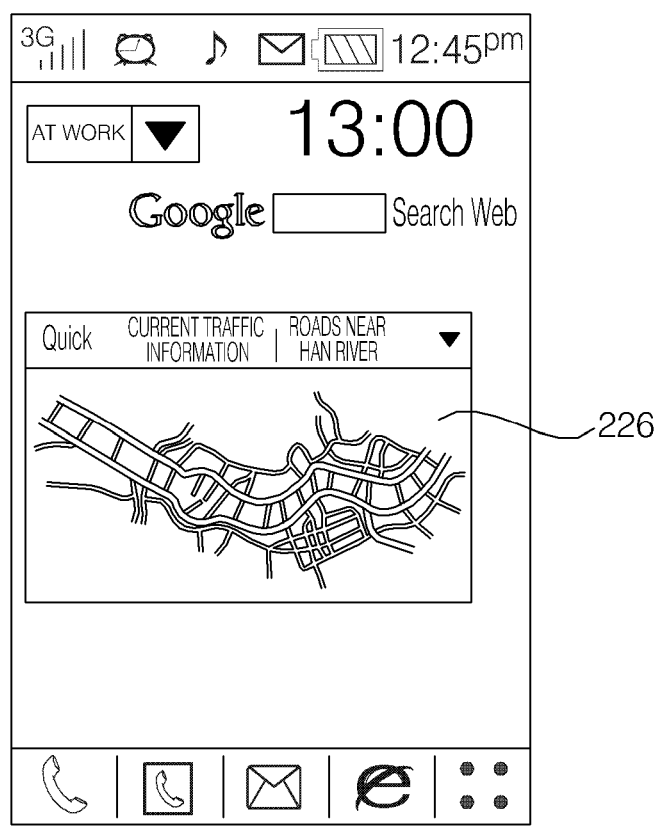
FIG. 11 illustrates a diagram of a screen including an 'edit' window when a traffic information widget is selected.

FIG. 11 illustrates a diagram of a screen displayed on the display module 151 when the traffic information widget 226 is selected. Referring to FIG. 11, the controller 180 may display the traffic information widget 226 below the search widget 225, which is a widget selected previously to the traffic information widget 226, may be displayed as a program execution window.

Figure 12:
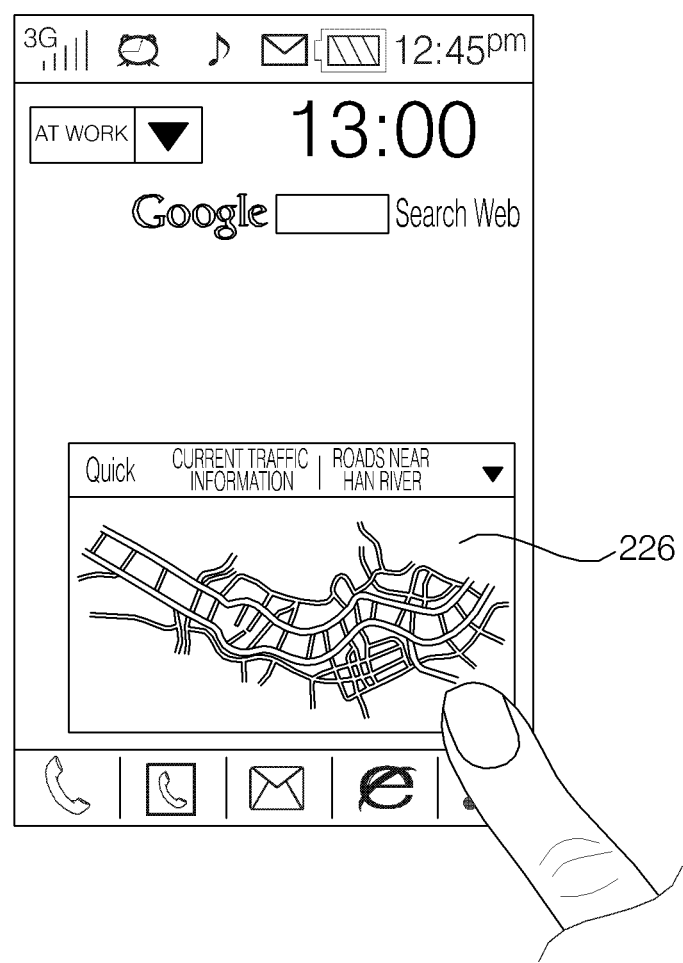
FIG. 12 illustrates a diagram of a screen for explaining how to arrange a traffic information widget.

The traffic information widget 226 may be displayed at a position where it is dragged and dropped. The traffic information widget 226 may display real-time traffic information acquired from a traffic information server (not shown) by the wireless internet module 115 on the display module 151. The display attributes of the traffic information widget 226 may be set using the same method used to set the display attributes of the search widget 225. The user may change the display position of the traffic information widget 226 simply by dragging and dropping the traffic information widget 226, as shown in FIG. 12.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to provide a user with different widget screens in different locations at different times. In addition, there is no need for a user to manually add or delete a widget to or from a home screen in consideration of the circumstances of a mobile terminal providing a single home screen.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal having a display, the method comprising:
   storing, in non-volatile memory of the mobile terminal, a plurality of home screen profiles set in advance by a user, wherein each profile of the plurality of home screen profiles identify a respective plurality of widgets and comprise widget information that correspond with the plurality of widgets of the profile, wherein the plurality of widgets, for each of the plurality of home screen profiles, are among a widget group comprising a plurality of different types of widgets, and wherein each profile of the plurality of home screen profiles comprises different groupings of the widgets of the widget group, and wherein the widget information specifies display attributes of the corresponding plurality of widgets;
   determining that a specific profile of the plurality of home screen profiles matches a pre-defined condition, wherein the determining occurs after the storing of the plurality of home screen profiles;
   displaying on the display a first home screen comprising the corresponding widgets of the specific profile of the plurality of home screen profiles based on the corresponding widget information if the specific profile of the plurality of home screen profiles matches the pre-defined condition; and
   displaying on the display a second home screen corresponding to a default home screen profile if all of the plurality of home screen profiles mismatch the pre-defined condition,
   wherein the first home screen comprises a widget selection area and a home screen profile area, the widget selection area comprising a plurality of widgets that can be registered in the home screen profile area according to a drag and drop input, and the home screen profile area comprising at least one widget that is registered in the specific home screen profile and is suitable for the pre-defined condition.

2. The method of claim 1, wherein the pre-defined condition comprises at least a time condition, a location condition or a weather condition.

3. The method of claim 2, wherein determining that the specific profile of the plurality of home screen profiles matches the pre-defined condition comprises comparing the location condition to location information of the mobile terminal acquired from a global positioning system (GPS) or a base station.

4. The method of claim 1, wherein the display attributes comprise at least a display position, transparency information, a display type or size of each of the plurality of corresponding widgets.

5. The method of claim 4, wherein the display type comprises an icon.

6. The method of claim 4, wherein the display type comprises a minimized window that can be displayed on a certain portion of the display to provide real-time information received from a base station.

7. A mobile terminal comprising:
   a display configured to display information and to receive touch input;
   non-volatile memory;
   a controller configured to:
      store in the non-volatile memory a plurality of home screen profiles set in advance by a user, wherein each profile of the plurality of home screen profiles identify a respective plurality of widgets and comprise widget information that correspond with the plurality of widgets of the profile, wherein the plurality of widgets, for each of the plurality of home screen profiles, are among a widget group comprising a plurality of different types of widgets, and wherein each profile of the plurality of home screen profiles comprises different groupings of the widgets of the widget group, and wherein the widget information specifies display attributes of the corresponding plurality of widgets;

determine that a specific profile of the plurality of home screen profiles matches a pre-defined condition, wherein the specific profile is determined after the storing of the plurality of home screen profiles;

cause displaying on the display a first home screen comprising the corresponding widgets of the specific profile of the plurality of home screen profiles based on the corresponding widget information if the specific profile of the plurality of home screen profiles matches the pre-defined condition; and cause displaying on the display a second home screen corresponding to a default home screen profile if all of the plurality of home screen profiles mismatch the pre-defined condition, wherein the first home screen comprises a widget selection area and a home screen profile area, the widget selection area comprising a plurality of widgets that can be registered in the home screen profile area according to a drag and drop input, and the home screen profile area comprising at least one widget that is registered in the specific home screen profile and is suitable for the pre-defined condition.

8. The mobile terminal of claim 7, wherein the pre-defined condition comprises at least a time condition, a location condition or a weather condition.

9. The mobile terminal of claim 8, wherein the controller is further configured to determine that the specific profile of the plurality of home screen profiles matches the pre-defined condition by:

acquiring location information of the mobile terminal from a global positioning system (GPS) or a base station; and
comparing the location information to the location condition.

10. The mobile terminal of claim 7, wherein the display attributes comprise at least a display position, transparency information, a display type or size of each of the plurality of corresponding widgets.

11. The mobile terminal of claim 10, wherein the display type comprises an icon.

12. The mobile terminal of claim 10, wherein the display type comprises a minimized window that can be displayed on a certain portion of the display to provide real-time information received from a base station.

13. A method of controlling a mobile terminal having a display, the method comprising:

storing, in non-volatile memory of the mobile terminal, a plurality of home screen profiles set in advance by a user, wherein each profile of the plurality of home screen profiles identify a respective plurality of widgets and comprise widget information that correspond with the plurality of widgets of the profile, wherein the plurality of widgets, for each of the plurality of home screen profiles, are among a widget group comprising a plurality of different types of widgets, and wherein each profile of the plurality of home screen profiles comprises different groupings of the widgets of the widget group, and wherein the widget information specifies display attributes of the corresponding plurality of widgets;

displaying on a specific portion of the display a profile selection menu for selecting one of the plurality of home screen profiles;

selecting a specific profile of the plurality of home screen profiles in response to a touch input received via the displayed profile selection menu, wherein the selecting occurs after the storing of the plurality of home screen profiles; and displaying on the display a home screen comprising the corresponding widgets of the selected profile of the plurality of home screen profiles based on the corresponding widget information wherein the home screen comprises a widget selection area and a home screen profile area, the widget selection area comprising a plurality of widgets that can be registered in the home screen profile area according to a drag and drop input, and the home screen profile area comprising at least one widget that is registered in the selected home screen profile.

14. The method of claim 13, wherein the display attributes comprise at least a display position, transparency information, a display type or size of each of the plurality of corresponding widgets.

15. The method of claim 13, wherein the plurality of widgets included in the widget selection area are displayed on a specific portion of the display as an icon.

16. The method of claim 13, wherein the at least one widget included in the home screen profile area is displayed on a specific portion of the display as a minimized application window for providing real-time information.

17. A mobile terminal comprising:

a display configured to display information and to receive touch input;
non-volatile memory;
a controller configured to:

store in the non-volatile memory a plurality of home screen profiles set in advance by a user, wherein each profile of the plurality of home screen profiles identify a respective plurality of widgets and comprise widget information that correspond with the plurality of widgets of the profile, wherein the plurality of widgets, for each of the plurality of home screen profiles, are among a widget group comprising a plurality of different types of widgets, and wherein each profile of the plurality of home screen profiles comprises different groupings of the widgets of the widget group, and wherein the widget information specifies display attributes of the corresponding plurality of widgets;

display on a specific portion of the display a profile selection menu for selecting one of the plurality of home screen profiles;

select a specific profile of the plurality of home screen profiles in response to a touch input received via the displayed profile selection menu, wherein the selecting occurs after the storing of the plurality of home screen profiles; and cause displaying on the display a home screen comprising the corresponding widgets of the selected profile of the plurality of home screen profiles based on the corresponding widget information, wherein the home screen comprises a widget selection area and a home screen profile area, the widget selection area comprising a plurality of widgets that can be registered in the home screen profile area according to a drag and drop input, and the home screen profile area comprising at least one widget that is registered in the selected home screen profile.

18. The mobile terminal of claim 17, wherein the display attributes comprise at least a display position, transparency information, a display type or size of each of the plurality of corresponding widgets.

19. The mobile terminal of claim 17, wherein the controller is further configured to control the display to display the at least one widget included in the home screen profile area on a specific portion of the display as an icon.

20. The mobile terminal of claim 17, wherein the controller is further configured to control the display to display the at least one widget included in the home screen profile area on a specific portion of the display unit as a minimized application window for providing real-time information.

21. The method of claim 1, wherein all of the plurality of widgets of each profile of the plurality of home screen profiles are different from the plurality of widgets of other profiles of the plurality of home screen profiles.

22. The method of claim 1, wherein only some of the plurality of widgets of each profile of the plurality of home screen profiles are different from the plurality of widgets of other profiles of the plurality of home screen profiles.

23. The method of claim 1, further comprising:
displaying some of the widgets of the specific profile as icons which are associated with an application that is executable by the mobile terminal; and
displaying one or more of the widgets of the specific profile as an executing application.

24. The method of claim 1, wherein the plurality of widgets included in the widget selection area are displayed on a specific portion of the display as an icon, and
wherein the at least one widget included in the home screen profile area is displayed on a specific portion of the display as a minimized application window for providing real-time information.

25. The mobile terminal of claim 7, wherein the controller is further configured to:
control the display to display the plurality of widgets included in the widget selection area on a specific portion of the display as an icon, and
control the display to display the at least one widget included in the home screen profile area on a specific portion of the display unit as a minimized application window for providing real-time information.

* * * * *